United States Patent [19]

Verghese

[11] 4,179,321

[45] Dec. 18, 1979

[54] METHOD OF APPLYING AND ADHEREING LUBRICANT TO A TIRE INNER TUBE AS IT IS FORMED

[75] Inventor: George T. Verghese, Bombay, India

[73] Assignee: The Firestone Tire & Rubber Company, Akron, Ohio

[21] Appl. No.: 906,721

[22] Filed: May 17, 1978

[51] Int. Cl.$^2$ .............................................. B29H 15/00
[52] U.S. Cl. .................................... 156/118; 106/272; 156/122; 156/289; 264/130; 427/189; 427/416; 428/484
[58] Field of Search ................................ 156/118–122, 156/289; 264/209, 129–131; 428/484, 492; 427/189, 201, 416, 443; 106/270–272

[56] References Cited

U.S. PATENT DOCUMENTS

| | | | |
|---|---|---|---|
| 1,516,113 | 11/1924 | Moldenhauer et al. | 106/272 |
| 2,658,004 | 11/1953 | Eldridge et al. | 106/272 |
| 2,748,013 | 5/1956 | Watson | 106/272 |
| 3,183,288 | 5/1965 | Taylor et al. | 264/130 |
| 3,321,346 | 5/1967 | Powell | 156/122 |
| 3,474,755 | 10/1969 | Voo | 264/130 |

Primary Examiner—John E. Kittle

[57] ABSTRACT

This disclosure relates to a lubricant comprised of a mixture of a binder and a lubricating agent in a certain predetermined ratio. The binder is a wax type material having a melting point below the surface onto which the lubricant is applied and the lubricating agent is selected from a group consisting of talc, mica, whiting or Kaolin (China Clay).

This lubricant is specifically designed to be applied to a relatively hot surface during a manufacturing operation so that the binder melts to form a film on the surface with the lubricating agent trapped or encapsulated within the film. The binder solidifies on cooling and the film then acts as a lubricant on the surface of the product in its later manufacturing operations and is of such a nature that it does not interfere with the final properties of the product. This lubricant and method are particularly well suited to manufacturing processes wherein unvulcanized rubber compounds are shaped into assemblies that are then incorporated into end products and vulcanized; for example, tubes for pneumatic tires, tires and the like.

5 Claims, No Drawings

METHOD OF APPLYING AND ADHEREING LUBRICANT TO A TIRE INNER TUBE AS IT IS FORMED

BACKGROUND OF THE INVENTION

This invention relates to a new lubricant and a method of lubricating an assembly which utilizes this lubricant. The lubricant comprises a mixture of a binder and a lubricating agent. In the method, the binder has a melting point below the temperature of the surface onto which the lubricant is applied so that, on application, the binder melts to form a film on the surface containing the lubricating agent. On cooling the binder solidifies encapsulating the lubricating agent and forming the lubricant on the surface for further processing steps.

This lubricant and method have been found to be particularly useful in manufacturing processes relating to rubber goods, specifically tubes for pneumatic tires and the like. By way of example, in the manufacturing process for rubber goods, rubber compounds containing the rubber polymer, either natural rubber, synthetic rubber, or combinations thereof, along with reinforcing agents, softeners, antioxidants, vulcanization accelerators and vulcanization agents are mixed to form an unvulcanized rubber compound. The rubber compound may then be formed into various preassemblies which are incorporated into the final product or directly to a final product. The final product is then normally placed into a mold and subjected to vulcanization temperatures resulting in the final, vulcanized end product. In many of these processes it is necessary to handle the unvulcanized rubber compound through several steps and to store the unvulcanized rubber compound between the processing steps.

An unvulcanized rubber compound is normally tacky or sticky so that when its surfaces contact other materials or other parts of the preassemblies, the surfaces will adhere and create a problem. It is, therefore, necessary to have a lubricant material that will prevent the sticking of the unvulcanized rubber assembly to itself or to other surfaces.

In the manufacture of tubes for pneumatic tires, the ingredients in an unvulcanized rubber compound are mixed to form the rubber compound. The rubber compound is then tubed or extruded. In this process, the rubber compound is made plastic by working it on a mill which thereby heats the rubber compound. The warm rubber compound is then passed through the tuber or extruder. The tuber may be thought of as a big meat grinder with a rotating screw in a barrel. The rubber compound is forced out of the end or head of the barrel through a die to form a predetermined shape by the pressure of the screw. This tubing operation is standard in the manufacture of many rubber goods.

This invention is applicable to the hot, tubed shape that results from the tubing operation. After the tubed shape is formed, the lubricant of this invention is applied to the surface of the shape. The surface of the shape has a temperature higher than the melting point of the binder material so that the binder melts on contact with the hot surface, thereby forming a film which contains the lubricating agent. The binder solidifies on cooling encapsulating the lubricating agent on the surface.

More specifically, in the manufacture of a tube for a pneumatic tire, the shape that exits from the die at the end of the tuber is a continuous cylinder or annular piece of uncured rubber compound. The lubricant is applied to the inner surface of the tube by a mechanical dispenser through a pipe connected to the "spider" and shaft of the tuber located in the tuber head. It is applied to the external surface of the tube by standard, known mechanical means. In this manner all of the surfaces of the tube, both the inner surfaces and the external surfaces, are lubricated so that they do not stick to one another. In the further manufacturing steps the continuous cylinder is cut to length for tubes, the ends spliced together, the valve is affixed and the resulting annular member is vulcanized in an appropriate mold to form the standard, tire innertube.

Prior lubricating materials utilized in the manufacture of rubber goods have comprised basically two types; lubricating agents in a powder form or lubricating agents in a liquid form. In the powder form lubricating agents such as talc (soapstone) have been mechanically applied to uncured rubber surfaces. Due to the powdery or dusty nature of these materials, severe problems have been encountered with the application of these materials due to their contamination of the ambient air (a dust problem), non-uniformity in the application of the material, non-uniformity in the material remaining on the surface after application and, lastly, the fact that these materials often cause contamination in the end products.

Attempts to use liquid lubricating agents have been undertaken to combat these problems, particularly the dusting problem. However, the liquid agents create a drying problem that is just as bothersome as the dusting problem. If the liquid lubricating agent has not sufficiently dried before the product is processed further (particularly vulcanized) faulty products will result.

SUMMARY OF THE INVENTION

This invention overcomes the lubricating problems identified above that have persisted in the rubber industry since its inception. Soapstone, a white powder of various particle sizes, has been utilized as a lubricant or dusting agent in the rubber industry for decades. Over the years, the rubber industry has become accustomed to living with the problems of lack of uniformity of application, lack of uniformity in retention of the lubricant on the surface, dust in the ambient air in the work place and contamination in the final product. The lubricant and method of this invention eliminates these problems and represents a significant advance over the art. The lubricant of this invention eliminates the dusting problem, is easily applied in a uniform manner and, once applied, is not removed to yield an unlubricated surface. Also, the materials of the lubricant do not present a contamination risk in the final product.

The lubricant of this invention comprises a mixture of two ingredients. The first ingredient is a wax type material. This material may be any of the known wax types that are compatible with rubber goods, specifically the paraffin type waxes, the microcrystalline type wax and beeswax or other similar type of wax. This wax material must have a melting point high enough to permit its application to the surface of the goods in a solid state yet low enough to be below the temperature of the surface to which it is applied so that it will melt on contact with the surface to form a film thereon. The wax material must be capable of solidifying on cooling after its application. In standard rubber processing steps, the wax should, therefore, have a melting point within the range of 100° F. to 180° F., preferably 130° F. to 150° F. range.

The second ingredient in the lubricant mixture of this invention is a lubricating agent. This material is a powder at standard conditions. The particle size of the powder is dependent upon the particular end use. Materials that may be used as the lubricating agents are the powder form of talc (natural hydrous magnesium silicate), whiting (calcium carbonate), mica (aluminum silicate or potassium aluminum silicate), Kaolin (China Clay) or like materials.

The mixing of the binder and the lubricating agent to yield the lubricant may be performed in any manner that results in a uniform mixture of these two ingredients. The Applicant has found it particularly helpful to first grate the solid binder material to obtain a fine particle size and then thoroughly mix the correct proportion of the powdery lubricating agent into the grated binder material. The resulting lubricant thereby contains a uniform dispersion of the powdery lubricating agent in the binder material.

The useful ratio of the binder material to the powdery lubricating agent is dictated by the processing conditions that the lubricant will be subjected to. The ratio must be such that the binder in the lubricant will not prematurely melt in the processing equipment prior to its application to the surface of the product, yet will melt upon application to the hot surface of the product. Also, the powdery lubricating agent must not create a dusting problem in the processing equipment prior to its application to the hot surface, must be present in a sufficiently large amount to perform the lubricating function, and must be capable of being encapsulated in the binder film. In the Applicant's processing steps with the Applicant's ingredients, ratios between 5% binder to 95% lubricating agent and 30% binder to 70% lubricating agent have been operative. Specifically, lubricants containing 10% binder—90% lubricating agent and 20% binder—80% lubricating agent have performed satisfactorily.

As demonstrated by the definition of the lubricant and method of this invention set out above, this invention results in a lubricant that is uniformly applied to the surface to be lubricated, that will not be removed or blown off the surface after its application leaving unlubricated surface areas, and that does not interfere with the physical properties of the end product. Specifically, the splice strength of a tube manufactured using this lubricant is satisfactory. The external appearance of a tube manufactured using this lubricant is better than either prior lubricants due to its uniform application and retention.

The lubricant of this invention also acts as a lubricant in the molding operation. Due to its adherance to the surface of the shape, it creates less lubricant build-up in the vulcanization molds thereby decreasing the frequency of cleaning the molds. This decrease in build-up in the molds also makes the molds more efficient. Finally, the lubricant and method of this invention eliminates the dust problem that has existed in the rubber industry for decades. This problem has been considered a necessary nuisance in the past.

The lubricant and method of this invention may be used with wide varities of rubber compounds; that is, the compounds may comprise any of the known polymeric materials, such as natural rubber, various synthetic rubbers (copolymers and homopolymers of butadiene, butyl rubber, neoprene, isoprene, and the like) and blends of any of these. The ratios of the polymers to the other ingredients may also vary over a wide range as is known in the art.

DETAILED DESCRIPTION OF THE INVENTION

The lubricant of this invention has been utilized in the manufacture of tubes for passenger and truck tires. In this operation, the shape that exists from the extruder is an annular shape, a continuous cylinder of hot, unvulcanized rubber compound.

The specific lubricant used was a mixture of 80% talc (magnesium silicate) of a particle size in the range of 300 to 350 mesh, and 20% paraffin wax having a melting point of approximately 145° F. The lubricant was manufactured by grating the solid wax into a fine particle size, mixing the powdery lubricating agent (talc) into the wax in the predetermined ratio, placing the mixture in a drum and rotating the drum slowly for about four hours.

This lubricant was applied to an unvulcanized shape (tube) as it exited the die in the tubing operation. The lubricant was applied to the external surfaces of the tube by a standard mechanical device normally utilized for the application of the prior powdery materials. It was necessary to modify the standard apparatus to apply the lubricant of this invention internally in the tube.

Under standard techniques that have long existed in the rubber industry, the lubricant is mechanically applied to the inside of the tube at the exit of the tuber by a conduit that passes from the storage hopper for the lubricant through the barrel of the tuber, through the head of the tuber and exits in the center of the die. The die is specifically designed to extrude the unvulcanized rubber in the form of a continuous cylinder with the exit end of the internal lubricating device located inside of this tubed cylinder. The temperatures attained in the extruder and at the die head are in excess of the melting temperatures of the binder in the lubricant. It is, therefore, necessary to insulate the conduit through which the lubricant of this invention passes so that it does not melt during its passage through the tuber barrel and the die head. This insulation has been successfully accomplished by adding a rubber hose as an additional layer to this conduit.

Both the external and inner surfaces of the cylindrical shaped tube of unvulcanized rubber compound as it exits the die of the tuber are between 200° and 250° F., preferably about 235° F. Therefore, as the lubricant of this invention is applied onto the innner surface of the tube through the conduit exit in the center of the die and onto the external surface of the tube through the standard mechanical means, the binder melts as it strikes the surface, the surface being well above the 145° melting temperature of the binder. This melting traps the powdery lubricating agent of this lubricant onto the surface of the tubed shape so that it cannot create a dust problem or cannot be removed. The tubed shape is then cooled by standard means, usually either circulating air or a spray of cold water, so that the hot, molten binder cools quickly and forms a film on the tubed shape. This film contains the trapped lubricating agent. The lubricated tube shape is then cut to its required length, spliced by standard means and eventually vulcanized by standard means.

The presence of the lubricant on the unvulcanized, tacky uncured shape prevents this shape from sticking to itself, to other pieces of its kind and to other things in its environment during the subsequent manufacturing steps. In the final processing step the tube is vulcanized in a standard mold by standard methods. During this molding operation the lubricant of this invention again acts as a lubricant to permit easy molding and removal of the piece from the mold. This lubricant, due to its even and stable application does not create a build-up of lubricant powder in the molds so that the molds do not become dirty from this build-up as readily as in the past.

Tubes manufactured of butyl rubber in both a passenger size and truck size using the lubricant and method of this invention were compared from the standpoint of various physical properties against tubes utilizing standard, commercial techniques. The tubes utilizing the lubricant and method of this invention were manufactured using the lubricant (80% paraffin wax and 20% talc) and the method specifically defined above. This lubricant was used as both the inner and the external lubricant and applied by the method described above. The control for this experiment utilized talc powder as the inner lubricant and whiting as the external lubricant. The following table illustrates the physical properties of the tubes so manufactured. This data demonstrates that the physical properties of the tube utilizing the lubricant of this invention are at least as good as the control tube and that the lubricant of this invention does not impair the splice strength of the tube.

| Passenger Size: G-15 | Control | | | | Invention | | | |
|---|---|---|---|---|---|---|---|---|
| Test No. | 1 | 2 | 3 | 4 | 1 | 2 | 3 | 4 |
| Modulus (psi) at 400% elongation | 700 | 700 | 675 | 650 | 575 | 600 | 600 | 625 |
| Tensile (psi) break | 1175 | 1425 | 1375 | 1450 | 1200 | 1325 | 1450 | 1300 |
| Elongation (%) | 565 | 600 | 625 | 640 | 600 | 640 | 670 | 595 |
| Average Splice Strength (psi) | 475 | 500 | 475 | 525 | 575 | 550 | 600 | 550 |

| Truck Size: 9:00–20 | Control | | | | Invention | | | |
|---|---|---|---|---|---|---|---|---|
| Test No. | 1 | 2 | 3 | 4 | 1 | 2 | 3 | 4 |
| Modulus @ 400% psi | 875 | 850 | 900 | 875 | 775 | 750 | 850 | 825 |
| Tensile @ brk. psi | 1350 | 1275 | 1325 | 1250 | 1150 | 1175 | 1325 | 1350 |
| Elongation % | 590 | 565 | 580 | 560 | 550 | 565 | 560 | 565 |
| Average Splicing Strength (psi) | 600 | 550 | 575 | 575 | 600 | 625 | 575 | 650 |

The lubricant and method of this invention have been specifically defined in relation to the manufacture of a tube for a pneumatic tire. It is understood that this invention encompasses the lubricant and its application to other types of extruded or calendered goods manufactured of unvulcanized rubber or plastic compounds.

I claim:

1. A method of lubricating a predetermined shape comprising an unvulcanized rubber compound during the manufacture of an end product containing said shape comprising the steps of mixing a binder having a melting point below a first temperature and a lubricating agent in a predetermined ratio to form a lubricant, forming said shape by known means, applying said lubricant to said shape while the surface of said shape is at a second temperature which is above said first temperature, melting said binder to form a film on said surface of said shape thereby encapsulating said lubricating agent onto said surface in a stable and uniform manner, cooling said shape so that said binder solidifies to encapsulate said lubricating agent, processing the resulting lubricated shape by further standard means to form said end product.

2. The method of claim 1 wherein said binder is selected from a group consisting of a paraffin wax and a microcrystalline wax and said lubricating agent is selected from a group consisting of talc, mica, whiting and china clay.

3. The method of claim 1 wherein said ratio of said binder to said lubricating agent is between 5% binder to 95% lubricating agent and 30% binder to 70% lubricating agent.

4. The method of claim 1 wherein said first temperature is below 130° F.

5. In the method of manufacturing a tube for pneumatic tires comprising a rubber compound containing natural or synthetic rubber, the steps comprising mixing a binder having a melting point below a first temperature and a powdery lubricating agent in a predetermined ratio to form a lubricant, extruding an unvulcanized rubber compound through an extruder to form a continuous annular shape, the surfaces of said shape when it exits said tuber being at a second temperature which is above said first temperature, applying said lubricant to both the inner and external surface of said annular shape, melting said binder to form a film containing said lubricating agent on said surfaces of said shape, cooling said shape to solidify said binder and encapsulate said lubricating agent within said binder film, and processing the resulting lubricated shape by further, standard means to form said tube.

* * * * *